(12) United States Patent
Liu et al.

(10) Patent No.: US 12,613,219 B2
(45) Date of Patent: Apr. 28, 2026

(54) METHODS OF DETERMINING VIABLE CELL COUNT AND IMPEDANCE-BASED BIOSENSORS FOR THE SAME

(71) Applicant: Georgia Tech Research Corporation, Atlanta, GA (US)

(72) Inventors: Zhaonan Liu, Atlanta, GA (US); Xuzhou Jiang, Atlanta, GA (US); Ben Wang, Atlanta, GA (US); Kan Wang, Atlanta, GA (US); Jialei Chen, Atlanta, GA (US); Chun Zhang, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 134 days.

(21) Appl. No.: 18/574,147

(22) PCT Filed: Jul. 15, 2022

(86) PCT No.: PCT/US2022/073795
§ 371 (c)(1),
(2) Date: Dec. 26, 2023

(87) PCT Pub. No.: WO2023/288314
PCT Pub. Date: Jan. 19, 2023

(65) Prior Publication Data
US 2024/0328996 A1 Oct. 3, 2024

Related U.S. Application Data

(60) Provisional application No. 63/222,111, filed on Jul. 15, 2021.

(51) Int. Cl.
*G01N 27/416* (2006.01)
*G01N 27/30* (2006.01)
(Continued)

(52) U.S. Cl.
CPC ......... *G01N 27/4166* (2013.01); *G01N 27/30* (2013.01); *G01N 27/40* (2013.01); *G01N 27/4035* (2013.01)

(58) Field of Classification Search
CPC .... G01N 27/4166; G01N 27/30; G01N 27/40; G01N 27/4035; G01N 15/01;
(Continued)

(56) References Cited

U.S. PATENT DOCUMENTS

2004/0065912 A1* 4/2004 Liu ........................ H10B 20/00
257/E27.071
2006/0049079 A1 3/2006 Brenner
(Continued)

OTHER PUBLICATIONS

A detailed model for high-frequency impedance characterization of ovarian cancer epithelial cell layer using ECIS electrodes. IEEE Transactions on Biomedical Engineering, V 56, p. 485-491 (Year: 2009).*
(Continued)

*Primary Examiner* — Lee E Rodak
*Assistant Examiner* — Zannatul Ferdous
(74) *Attorney, Agent, or Firm* — TROUTMAN PEPPER LOCKE LLP; Ryan A. Schneider; Harrison Lawrence

(57) ABSTRACT

Disclosed herein are impedance-based biosensor systems comprising an impedance-based biosensor having an electrode, a meter in electrical communication with the electrode, a processor in electrical communication with the impedance-based biosensor and the meter, and a memory storing instructions to be executed by the processor. The instructions can cause the impedance-based biosensor system to measure the impedance of the electrode, derive one or more electrical properties of the impedance-based biosensor from the impedance of the electrode, and calculate a viable cell count based on the one or more electrical properties.

17 Claims, 15 Drawing Sheets

(51) Int. Cl.
  *G01N 27/40*     (2006.01)
  *G01N 27/403*    (2006.01)

(58) Field of Classification Search
  CPC ....... G01N 2015/0687; G01N 15/0656; G01N
                15/0266; G01N 2015/0277; G01N
                                        2015/0294
  See application file for complete search history.

(56)                References Cited

U.S. PATENT DOCUMENTS

| | | | |
|---|---|---|---|
| 2006/0216689 A1 | 9/2006 | Maher et al. | |
| 2009/0269841 A1 | 10/2009 | Wojciechowski et al. | |
| 2014/0371564 A1* | 12/2014 | Anikeeva ............. | A61N 1/0551 |
| | | | 604/20 |
| 2015/0349236 A1* | 12/2015 | Furuta .................... | G02B 7/102 |
| | | | 347/68 |
| 2016/0047770 A1 | 2/2016 | Tyler et al. | |
| 2019/0117964 A1 | 4/2019 | Bahrami et al. | |
| 2019/0225928 A1 | 7/2019 | Masquelier et al. | |
| 2020/0055044 A1* | 2/2020 | Qin ................... | B01L 3/502715 |
| 2020/0400603 A1 | 12/2020 | Hirano | |
| 2021/0080362 A1* | 3/2021 | Lutnesky ................ | B01L 3/502 |
| 2022/0274372 A1* | 9/2022 | Casey .................... | B32B 5/022 |
| 2023/0249992 A1* | 8/2023 | Sasaki ....................... | C01B 5/00 |
| | | | 204/632 |

OTHER PUBLICATIONS

International Search Report and Written Opinion from Application
No. PCT/US2022/073795 dated Oct. 6, 2022.

\* cited by examiner

200

230

210

220

METHODS OF DETERMINING VIABLE CELL COUNT AND IMPEDANCE-BASED BIOSENSORS FOR THE SAME

CROSS-REFERENCE TO RELATED APPLICATIONS

This application claims the benefit of U.S. Provisional Application Ser. No. 63/222,111, filed on 15 Jul. 2021, the entire contents and substance of which are incorporated herein by reference in their entirety as if fully set forth below.

FEDERALLY SPONSORED RESEARCH OR DEVELOPMENT

This invention was made with government support under R01 FD006598 awarded by the Food and Drug Administration, and 1648035 awarded by the National Science Foundation. The government has certain rights in the invention.

FIELD OF THE DISCLOSURE

The present disclosure relates generally to impedance-based biosensors. Particularly, embodiments of the present disclosure relate to impedance-based biosensors for determining viable cell count in a culture medium.

BACKGROUND

Cell therapies have shown great potential and excellent clinical results in treating various cancers, Blood disorders, and autoimmune diseases. Two types of chimeric antigen receptor (CAR)-T cell therapies have recently been approved by U.S. Food and Drug Administration (FDA), which is widely considered a milestone in cancer treatment. However, both CAR-T cell therapies, as autologous therapies, have much higher prices than allogeneic cell therapies. One reason is that the bioreactor, or its parts that have direct contact with cells, may not be reusable. The extremely high costs hinder the affordability and accessibility of these promising treatments. Currently, one of the foremost demands in the CAR-T cell therapy industry is to reduce the cost to a level that is affordable for average families and reimbursable to health insurance providers. To achieve this goal, scaling up the cell manufacturing process and employing automated process control are two important approaches, as the consumables and labor costs are the two major components in this industry. Both approaches require non-destructive, in-line monitoring of critical quality attributes (CQAs).

Viable cell count (VCC) is an important CQA that directly reflects overall cell growth and provides valuable information for decision-making in a cell manufacturing process. Mainstream cell growth monitoring methods have been heavily relying on sampling and microscopy, which are usually labor-intensive and time-consuming. Although various technologies have been developed to reduce human labor involved in optical monitoring methods, most of the technologies are limited by the focus range and speed. Therefore, these methods are considered invasive and off-line during cell culturing.

What is needed, therefore, are methods and sensors for determining viable cell count in a culture medium. Embodiments of the present disclosure address this need as well as other needs that will become apparent upon reading the description below in conjunction with the drawings.

BRIEF SUMMARY OF THE DISCLOSURE

The present disclosure relates generally to impedance-based biosensors. Particularly, embodiments of the present disclosure relate to impedance-based biosensors for determining viable cell count in a culture medium.

An exemplary embodiment of the present disclosure can provide an impedance-based biosensor comprising: an electrode polarization component; a cell suspension component; and an LCR meter configured to measure an impedance of the electrode polarization component and the cell suspension component.

In any of the embodiments disclosed herein, the electrode polarization component can be a first flat electrode and a second flat electrode, the first flat electrode and the second flat electrode being parallel, and the cell suspension component can be a volume between the first flat electrode and the second flat electrode.

In any of the embodiments disclosed herein, the electrode polarization component can be a substrate configured to flex and conduct electricity and the cell suspension component can be a volume in which the substrate is disposed.

In any of the embodiments disclosed herein, the electrode polarization component and the cell suspension component can be in series.

In any of the embodiments disclosed herein, the electrode polarization model can be expressed in permittivity and the cell suspension model can be expressed in impedance, and the relationship between the electrode polarization model and the cell suspension model can be defined as:

$$\varepsilon^* = \frac{1}{jC_0\omega Z^*},$$

wherein $\varepsilon^*$ is permittivity, $Z^*$ is impedance, $\omega$ is radial frequency, $j$ is the imaginary unit, and $C_0$ is a sensor geometry constant.

In any of the embodiments disclosed herein, the cell suspension component can be defined as the Cole-Cole relaxation model, and the impedance of the cell suspension component can be calculated according to the Cole-Cole relaxation model adjusted by a culture media conductivity constant.

In any of the embodiments disclosed herein, the electrode polarization component can be defined as a constant phase element, and the impedance of the electrode polarization component can be calculated by adjusting the constant phase element by a resistance constant.

In any of the embodiments disclosed herein, the electrode polarization component and the cell suspension component can be configured to be in fluid communication with a culture medium containing cells.

In any of the embodiments disclosed herein, the culture medium containing cells can comprise living human cells.

Another embodiment of the present disclosure can provide a method of determining viable cell count in a culture medium containing cells, the method comprising: measuring, by an LCR meter, the impedance of an electrode polarization component and a cell suspension component; calculating a total impedance of the electrode polarization component and the cell suspension component; and calculating the viable cell count based on the total impedance.

In any of the embodiments disclosed herein, the electrode polarization component can be a first flat electrode and a second flat electrode, the first flat electrode and the second flat electrode being parallel, and the cell suspension component can be a volume between the first flat electrode and the second flat electrode.

In any of the embodiments disclosed herein, the electrode polarization component can be a substrate configured to flex and conduct electricity and the cell suspension component is a volume in which the substrate is disposed.

In any of the embodiments disclosed herein, the electrode polarization component and the cell suspension component can be in series.

In any of the embodiments disclosed herein, the electrode polarization model can be expressed in permittivity and the cell suspension model can be expressed in impedance, and the relationship between the electrode polarization model and the cell suspension model can be defined as:

$$\varepsilon^* = \frac{1}{jC_0 \omega Z^*},$$

wherein $\varepsilon^*$ is permittivity, $Z^*$ is impedance, $\omega$ is radial frequency, $j$ is the imaginary unit, and $C_0$ is a sensor geometry constant.

In any of the embodiments disclosed herein, the cell suspension component can be defined as the Cole-Cole relaxation model, and the impedance of the cell suspension component can be calculated according to the Cole-Cole relaxation model adjusted by a culture media conductivity constant.

In any of the embodiments disclosed herein, the electrode polarization component can be defined as a constant phase element, and the impedance of the electrode polarization component can be calculated by adjusting the constant phase element by a resistance constant.

In any of the embodiments disclosed herein, the culture medium containing cells can comprise living human cells.

Another embodiment of the present disclosure can provide an impedance-based biosensor system comprising: an impedance-based biosensor comprising an electrode; a meter in electrical communication with the electrode; a processor in electrical communication with the impedance-based biosensor and the meter; and a memory storing instructions that, when executed by the processor, cause the impedance-based biosensor system to: measure, by the meter, the impedance of the electrode; derive one or more electrical properties of the impedance-based biosensor from the impedance of the electrode; and calculate a viable cell count based on the one or more electrical properties.

In any of the embodiments disclosed herein, the electrode can comprise a first flat electrode and a second flat electrode, the first flat electrode and the second flat electrode being parallel, and a cell suspension volume can be defined between the first flat electrode and the second flat electrode.

In any of the embodiments disclosed herein, the impedance-based biosensor can further comprise a substrate configured to flex and conduct electricity.

In any of the embodiments disclosed herein, the electrode can comprise an IC side probe and one or more EC side probes, and a cell suspension volume can be defined in a hollow fiber lumen in which the one or more EC side probes are disposed.

In any of the embodiments disclosed herein, the electrode can be modeled as a constant phase element, and the impedance of the electrode can be calculated by adjusting the constant phase element by a resistance constant.

In any of the embodiments disclosed herein, the impedance-based biosensor can be disposed in a culture medium containing cells comprises living human cells.

In any of the embodiments disclosed herein, deriving one or more electrical properties can comprise deriving a hollow fiber impedance using an equivalent circuit model.

These and other aspects of the present disclosure are described in the Detailed Description below and the accompanying figures. Other aspects and features of embodiments of the present disclosure will become apparent to those of ordinary skill in the art upon reviewing the following description of specific, exemplary embodiments of the present invention in concert with the figures. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
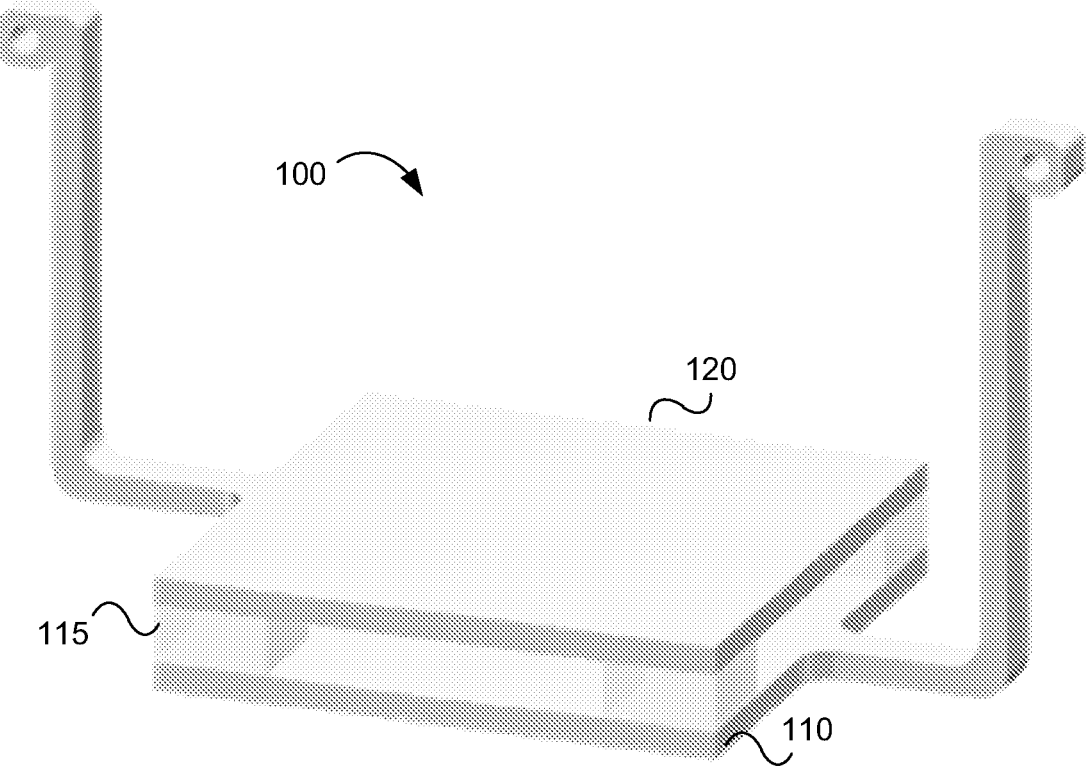
FIG. 1 illustrates an example impedance-based biosensor in accordance with the present disclosure.

Electric impedance measurements can be used to characterize the change in electrical properties induced by cell expansion as an alternative approach to achieve non-invasive and label-free cell growth monitoring. Probes embedded in the culturing system can monitor cell growth without sampling, thereby avoiding any disturbance in the culturing media. Aside from noninvasiveness, another major merit of impedance measurements can be the selectivity in cell monitoring, as it only responds to viable cells. The selectivity grants impedance measurements the ability to monitor viable cell count (VCC), a CQA that is not practical to obtain by conventional optical methods without staining the cells. As an indicator of the overall cell growth, VCC can detect anomalies, provide instructions for harvest time, and make assessments of cell products. Besides VCC, this technique can also be effective in monitoring cell viability, cell morphology, and orientation. According to a variety of purposes and applications, diverse impedance-related measurements for cell culturing processes can be used, including, but not limited to: electric cell-substrate impedance sensing (ECIS), electric impedance spectroscopy (EIS), impedance flow cytometry (IFC), and impedance sensing for cells cultured in the 3D scaffolds.

Despite its great potential, impedance-based cell growth sensors face several hurdles in their application for in-line cell growth monitoring in cell manufacturing processes. First, a knowledge gap exists in describing the electrical property of a living cell and its dependency on different attributes of the cell. Without wishing to be bound by any particular scientific theory, there may be a dependency on VCC, cell size, cell morphology, cell viability, and culture media conductivity. However, a comprehensive analysis on the combined effect of those factors and an expedition towards distinguishing them is lacking. Such attributes can be modeled with their dependencies based on physical knowledge. Due to the complex structures of living cells, however, such methods make assumptions to simplify the physical model. A commonly used assumption can be that a living cell can be viewed as a conducting volume enclosed by a spherical insulating shell. However, this assumption can be oversimplified since it does not take into account the organelles that may also contribute to the electrical property of the cell. Although there can be more sophisticated assumptions such as ellipsoidal multi-shell structures, they may still fail to model complex living cells accurately. As a result, these methods can often have results that deviate significantly from experimental data.

Second, the sensor readings can contain noise from several sources. Multiple factors, including VCC, cell size, culturing media conductivity, can all contribute to the electrical property of the cell suspension, thus affecting impedance readings simultaneously. In a cell manufacturing process, these factors are all constantly changing. On one hand, the sensor readings can contain all of such information, paving the way to sensing multiple CQAs at the same time.

On the other hand, the intertwined information can pose a major challenge to the analysis of the sensor readings.

Third, most sensors can rely on expensive materials and complex setups to eliminate or reduce Electrode polarization (EP) effect. The EP effect is a hurdle of electrical impedance measurements of liquids, obscuring the impedance signal in the low-frequency range. To eliminate or reduce EP effect, some sensors can use platinum for electrodes, conduct surface treatment, or adopt complex experimental setups. Since all CAR-T cell therapies available today are autologous, cells being manufactured for each patient are different. Parts in the bioreactor that have direct contact with cells typically cannot be reused for another patient, including impedance-based cell growth sensors. Thus, a disposable impedance-based cell growth sensor can be the desirable for CAR-T cell manufacturing. To bring down the cost, materials used for the sensors can be low-cost and biocompatible.

Disclosed herein are disposable 3D sensors comprising low-cost materials and compact design that can enhance their performance with gray-box data analysis. The sensors can adopt a two-electrode, parallel-plate design, consisting of EDM (electrical discharge machining) cut aluminum electrodes and PDMS (polydimethylsiloxane) spacers. The sensors can be customized for different applications to achieve low-cost, in-line, and noninvasive monitoring for the suspension cell growth in cell manufacturing. This design can also allow the medium and floating cells to dynamically diffuse into and out of the detectable region during the culturing process. With a well-defined detected volume with an almost uniform electric field, the parallel-plate sensor array can provide reliable cell density information with a spatial resolution inside the bioreactor.

A gray-box model combining physics-based and data-driven methods can be used to analyze the impedance data collected with the measurement system. An equivalent circuit model can extract features from the sensor readings. Then, the system can insert selected features as well as image-based cell count data into a gray-box model. The accuracy of the model can be tested by predicting new data points. A physics-based model can be used as a baseline method to evaluate the proposed method. The results show that the disclosed method can be promising to monitor the suspension cell growth in cell manufacturing, and offer critical information, for example, abnormality and estimated harvesting time, for decision making in practice. The disclosed method also can provide an approach toward a better understanding of the electrical properties of living cells.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

The disclosed impedance-based biosensor systems can comprise an impedance-based biosensor and a measurement system. The impedance-based biosensor can be customizable for various bioreactor geometries. The measurement system can continuously acquire data from the impedance-based biosensor and can derive cell density by applying methods and models disclosed herein depending on and corresponding to the specific type of impedance-based biosensor. The impedance-based biosensor can be configured in a variety of geometries; however, by way of illustration and not limitation, some specific examples are outlined below. For instance, the impedance-based biosensor can be a parallel plate sensor (FIG. 1), a flexible impedance sensor (FIG. 2), or a trans-wall impedance sensor for hollow fiber bioreactors (FIG. 3). It is understood that other geometries and configurations can be used corresponding to other types of bioreactors not shown but contemplated by those of ordinary skill in the art.

A flexible impedance sensor can deform to accommodate different bioreactor geometries. Such a design can enable cell density monitoring even if the total volume of the cell culture medium is low. A power-law relationship can be established between the measured low-frequency dielectric dispersion (LFDD) and cell density by using the LFDD time constant.

As would be understood, a hollow fiber reactor can have an intracapillary (IC) volume within the hollow fibers and an extracapillary (EC) volume in the bulk surrounding the hollow fibers. A trans-wall impedance sensor can comprise an IC probe inserted at the IC inlet and one or more EC probes inserted at different locations along the bioreactor to collect localized signals. The EC probes can measure localized specific capacitance of the hollow fiber wall and the cells attached thereto. Cell density can be derived from the capacitance.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 illustrates an example of an impedance-based biosensor 100. As shown, the impedance-based biosensor 100 can comprise a bottom electrode 110, a top electrode 120, and a spacer layer 115 between the bottom electrode 110 and the top electrode 120. The bottom electrode 110 and a top electrode 120 can be connected to an LCR meter or any other electrical property measurement device.

The meter, or any electrical property measurement device, can measure the impedance of the impedance-based biosensor 100. From the raw impedance data, features can be extracted to derive electrical properties. These electrical properties can be used to relate to cell density and other culture properties. For example, α-dispersion can be extracted from raw impedance data and characteristic frequency can be determined from the α-dispersion. A power-law relationship can be calculated between the characteristic frequency and cell density measured by the impedance-based biosensor 100.

Figure 2:
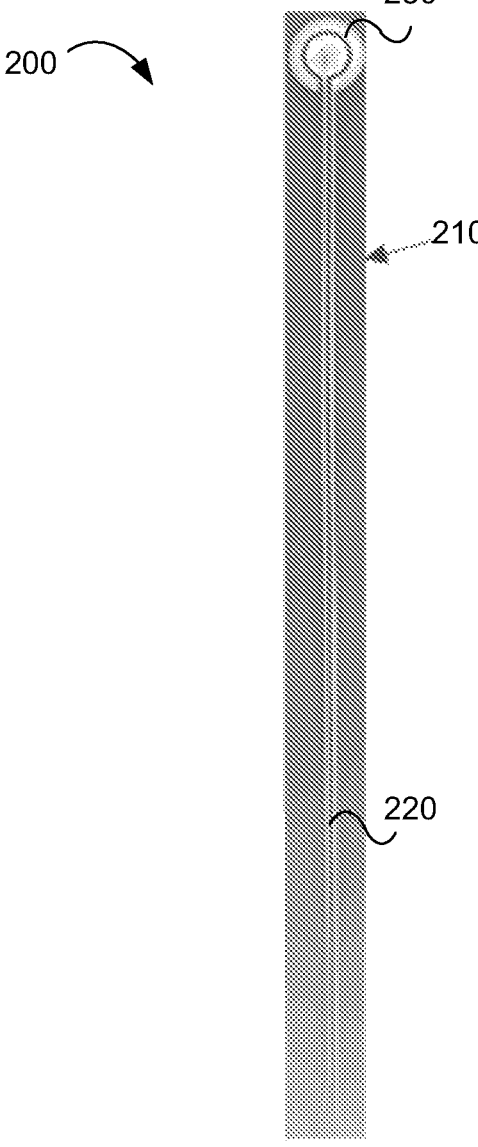
FIG. 2 illustrates another example impedance-based biosensor in accordance with the present disclosure.
Figure 3:
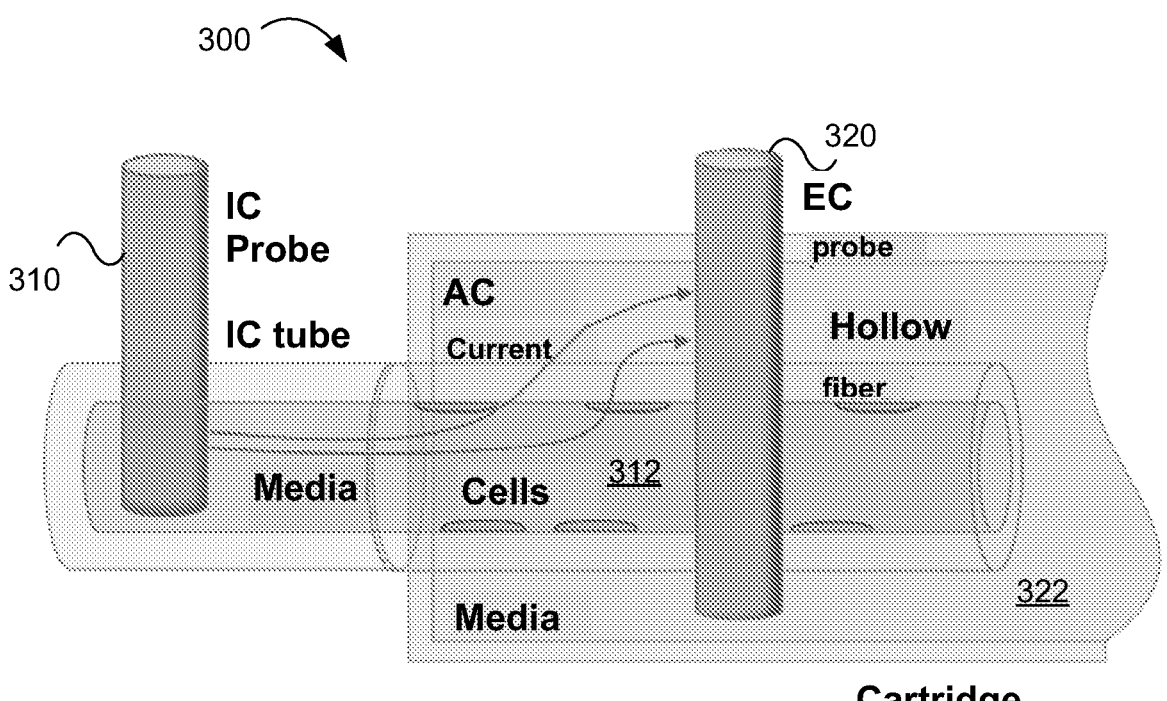
FIG. 3 illustrates another example impedance-based biosensor in accordance with the present disclosure.

FIG. 2 illustrates another example of an impedance-based biosensor 200. As shown, the impedance-based biosensor 200 can comprise a substrate 210, one or more conductive wires 220 disposed on the substrate 210, and a flexible electrode 230 disposed on the substrate 210 and in electrical communication with the one or more conductive wires 220. The one or more conductive wires 220 can be connected to an LCR meter or any other electrical property measurement device.

The meter, or any electrical property measurement device, can measure the impedance of the impedance-based biosensor 200. From the raw impedance data, features can be extracted to derive electrical properties. These electrical properties can be used to relate to cell density and other culture properties. For example, α-dispersion can be extracted from raw impedance data and characteristic frequency can be determined from the α-dispersion. A power-law relationship can be calculated between the characteristic frequency and cell density measured by the impedance-based biosensor 200.

FIG. 3 illustrates another example of an impedance-based biosensor 300. As shown, the impedance-based biosensor 300 can comprise an IC probe 310 in fluid communication with an IC volume 312 and one or more EC probes 320 in fluid communication with an EC volume 322. The IC volume 312 can comprise a culture medium for growing a plurality of cells. The IC probe 310 and the one or more EC probes 320 can be connected to an LCR meter or any other electrical property measurement device.

The meter, or any electrical property measurement device, can measure the impedance of the impedance-based biosensor 300. From the raw impedance data, features can be extracted to derive electrical properties. These electrical properties can be used to relate to cell density and other culture properties. For example, hollow fiber wall impedance can be extracted from raw impedance data and hollow fiber wall capacitance can be determined from the hollow fiber wall impedance using an equivalent circuit model. A power-law relationship can be calculated between the hollow fiber wall capacitance and cell density measured by the impedance-based biosensor 300.

Figure 4:
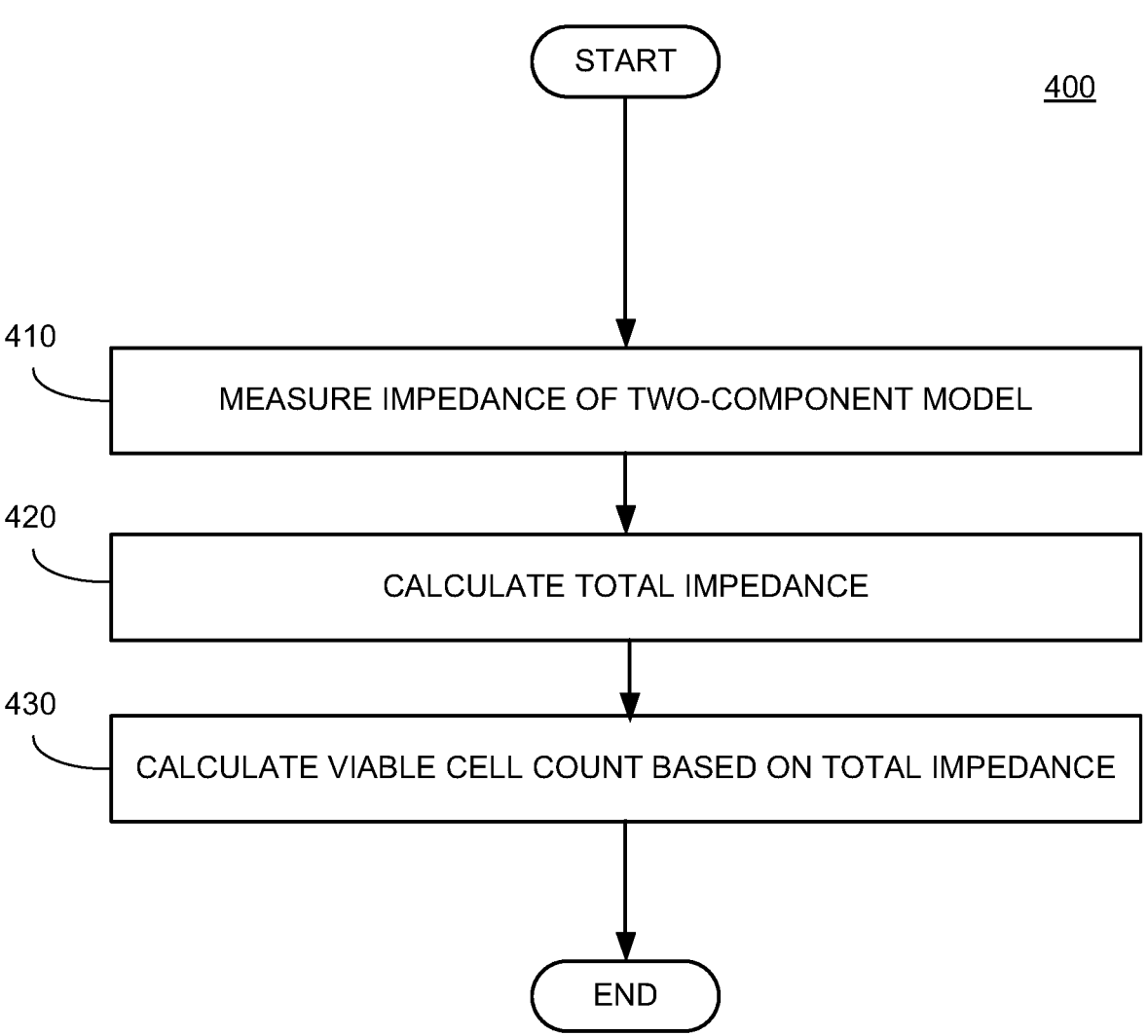
FIG. 4 illustrates a flowchart of a method of determining viable cell count in accordance with the present disclosure.

FIG. 4 illustrates a flowchart of a method 400 of determining viable cell count. As shown, the method 400 can provide for measuring 410 the impedance of a two-component model to model an electrode in a culture medium. The method 400 can further provide for calculating 420 a total impedance of the electrode. The total impedance can be used to derive one or more electrical properties, such as a dielectric constant or a capacitance. The method 400 can further provide for calculating 430 a viable cell count of the culture medium based on the total impedance and/or the one or more derived electrical properties.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

EXAMPLES

The following examples are provided by way of illustration but not by way of limitation.

Human leukemic T-cells (Jurkat E6-1; American Type Culture Collection, ATCC®) can be cultured in ATCC-formulated culture medium (RPMI-1640; GE Healthcare) with 10% fetal bovine serum, 2 mM L-glutamine, 10 mM 4-(2-hydroxyethyl)-1-piperazineethanesulfonic acid (HEPES), 1 mM sodium pyruvate, 4500 mg/L glucose, and 1500 mg/L sodium bicarbonate in a 75 $cm^2$ Petri Dish (Nunc™EasYFlask™; ThermoFisher Scientific™). All the cells can be cultured in a humidified incubator controlled at 37° C. and 5% $CO_2$, and all the culture media can be pre-heated to avoid the temperature effect on the impedance measurement. The cells can be counted by an automated cell counter (TC20™; Bio-Rad Laboratories, Inc.), and the concentration can be maintained between $1\times10^5$ and $1\times10^6$ cells/mL.

Figure 5:
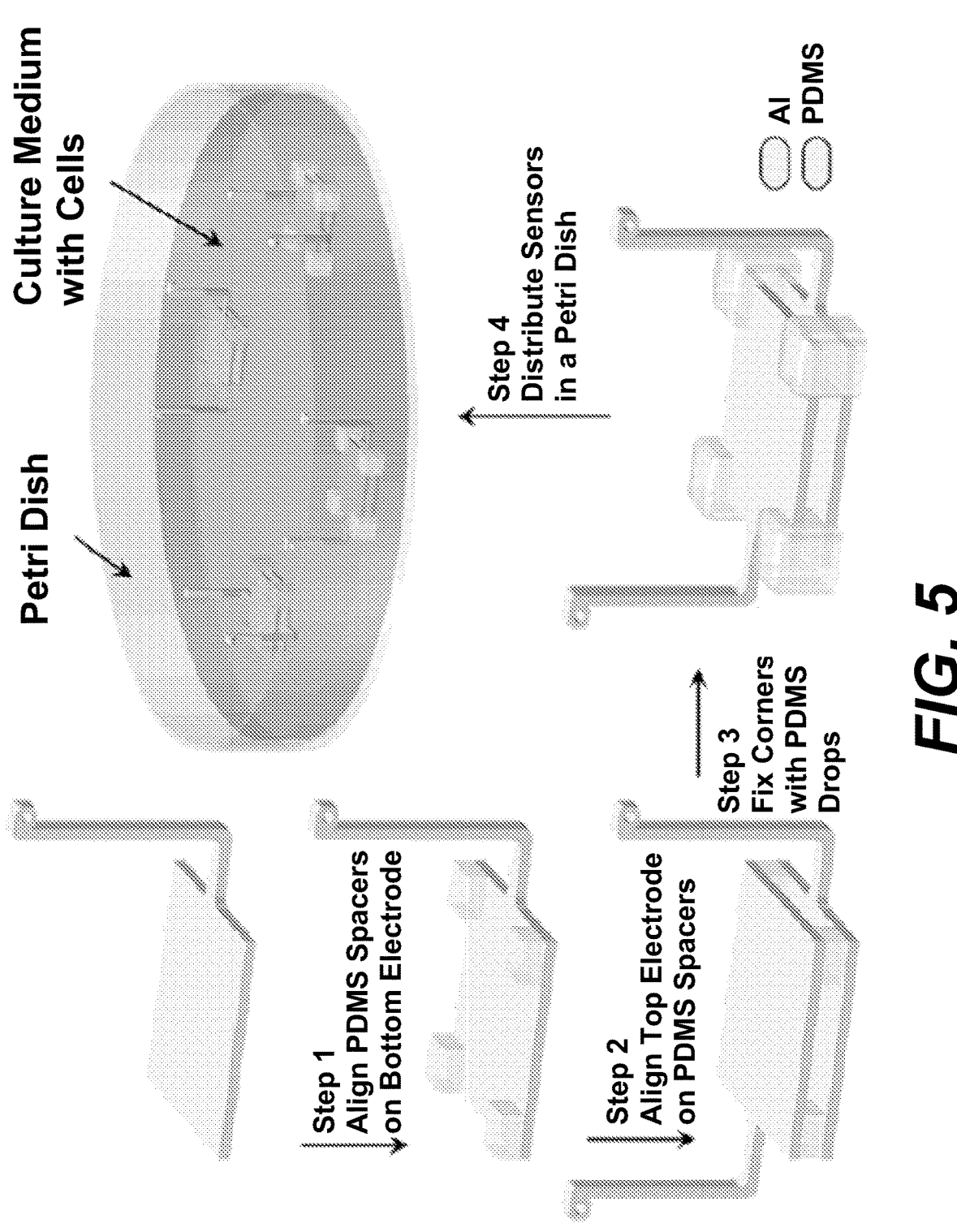
FIG. 5 illustrates a process flow of making an impedance-based biosensor according to some examples of the present disclosure.

A disposable 3D impedance sensor can comprise a pair of parallel-plate electrodes and PDMS (Sylgard 184, Tow Corning) to maintain a gap between the two electrodes. The process flow of a disposable 3D impedance sensor is presented in FIG. 5. Firstly, a square bottom electrode with a connecting tail can be cut from a 0.4 mm thick Aluminum plate (Corrosion-Resistant 3003, McMaster-Carr®) by a precise EDM. The edge length of the electrode can range from 9 mm to 16 mm. The connection can be gently bent up, and an interconnection wire can be carefully soldered to its end with stable and low contact resistance. Secondly, four cured PDMS spacers can be aligned at all the corners of the bottom electrode. The thickness of the spacer can vary from 0.5 mm to 2 mm, while the edge length of the space can be 2 mm. Then, another electrode as the top electrode can be aligned on the PDMS spacers to form the parallel plate structure. One uncured PDMS drop can be placed at each corner and cured at 125° C. for 20 minutes to fix the electrodes and spacers. By repeating the above procedures, a sensor array can be fabricated for distributive sensing in the bioreactor. To sterilize the entire structure, the assembled sensors can be immersed in ethanol for 10 minutes and completely air dried under UV light for 2 hours in a biological safety cabinet (BSC). At last, a layer of uncured PDMS can be painted on the bottom of the sensors to fix them on the surface of the Petri dish. To cure this layer of PDMS completely, the sensor array and Petri dish can be placed inside the BSC for 48 hours at room temperature.

Figure 6:
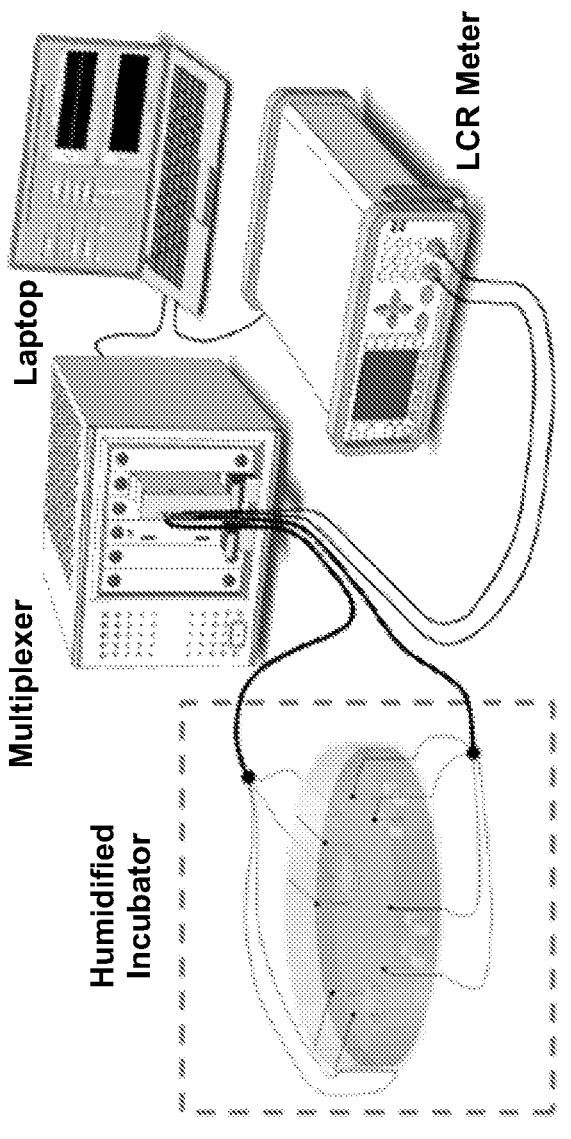
FIG. 6 illustrates a schematic of an impedance-based biosensor system according to some examples of the present disclosure.

A schematic of the impedance measurement system is presented in FIG. 6. Impedance measurements can be conducted by an LCR meter (E4980AL; Keysight Technologies) with a sinusoidal signal of 22 mVrms under 15 selected frequencies ranging from 300 Hz to 100 kHz. A multiplexer (PXI-2530B; National Instruments) can be integrated with the sensor array to connect each sensor to the LCR meter sequentially. A customized software can be coded by LabVIEW™ to acquire the impedance data of the sensor array every 15 minutes.

The sensor array can be distributed on the bottom of the culture dish and immersed in the suspension of medium and well-distributed cells, and the cells can freely flow in and out of each sensor. All sensors can be short-circuited by clipping their two electrodes together to measure the impedance introduced by the multichannel system. This part of impedance can be considered as the system error and subtracted from the measured results during the cell culture.

Raw data collected from the LCR meter can be impedance spectra that contain information from everything in between the two electrodes. To disentangle the signal from different sources and find the relationship between sensor readings and cell growth, first, the method can extract features from the sensor readings. As disclosed herein, sensors with compact design and low-cost materials can be deliberately used to evaluate their potentials in scaled-up applications. However, without wishing to be bound by any particular scientific theory, these sensors can run into large noise due to the EP effect. To account for the EP effect, a two-component equivalent circuit model can be used to process the raw impedance data collected from the LCR meter. The model can comprise two components in series: a cell suspension component and an EP effect component.

Figure 7:
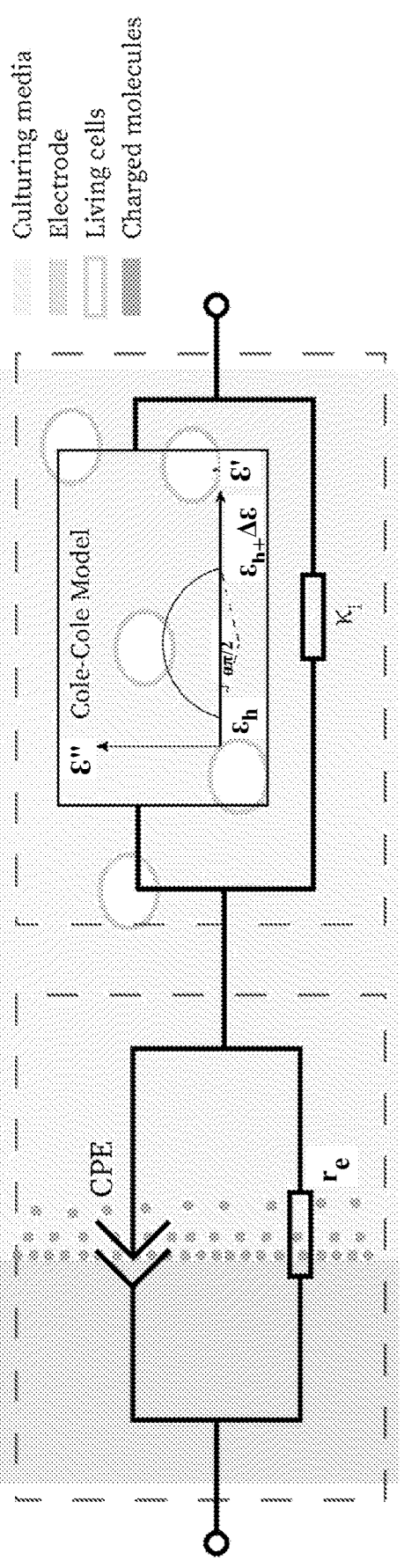
FIG. 7 illustrates a two-component model of an impedance-based biosensor according to some examples of the present disclosure.

As shown in FIG. 7, the cell suspension component can describe the electrical property of the cell suspension in between the two electrodes, while the EP effect component can describe the electrical property in the vicinity of the electrode surface. Since the current passes through the two components consecutively, they can be in series.

The present disclosure can use the Cole-Cole relaxation model for the cell suspension component, and constant phase element (CPE) model for the EP effect component. However, the Cole-Cole relaxation model can be expressed in permittivity, while CPE model can be expressed in impedance. To integrate these two components, the cell suspension component can be rewritten in impedance. For a sinusoidal AC condition, the equations below can be used to convert impedance and permittivity to each other:

$$\varepsilon^* = \frac{1}{jC_0\omega Z^*}, \tag{1}$$

where $\varepsilon^*$ denotes permittivity, $Z^*$ denotes impedance, $\omega = 2\pi f$ is radial frequency, j is the imaginary unit and $C_0$ is a real constant representing the sensor geometry. Here, j denotes the imaginary unit and superscript * is a notation for complex variables.

Electrical properties of cell suspension can stem from the study of colloidal suspensions. Colloids suspended in liquid electrolytes can exhibit Maxwell-Wagner (MW) dielectric relaxation when applied with an AC electric field. M-W relaxation process can happen at the interface of two different materials. An ideal M-W relaxation can be a single-time relaxation that can be described with a Debye relaxation model. However, in most scenarios, relaxation processes observed in electrolytes can be non-ideal, deviating from the Debye model. M-W relaxation of spherical cell suspension can be frequently described with an empirical model called the Cole-Cole relaxation model:

$$\varepsilon_{C-C}^*(f) = \frac{\Delta\varepsilon}{1 + \left(\frac{jf}{f_{C-C}}\right)^{1-\alpha}} + \varepsilon_h, \qquad (2)$$

where the complex permittivity spectrum $$\varepsilon_{C-C}^*(f)$$

is determined by the characteristic frequency $f_{C-C}$, relaxation strength $\Delta\varepsilon$, permittivity at the high-frequency limit $\varepsilon_h$, and an empirical parameter $\alpha > 0$. The Cole-Cole relaxation can be visualized in a frequency-implicit Cole-Cole plot, where imaginary permittivity is plotted against real permittivity, as a minor arc with its center below the real axis (See FIG. 7). The present disclosure can adopt the Cole-Cole relaxation model to extract features in the cell suspension component.

In addition, to address conductivity of cell suspension at low frequency, culture media conductivity $\kappa_1$ can be introduced in the cell suspension component. The impedance of the cell suspension component can be written as:

$$Z_{CS}^* = \frac{1}{jC_0\omega\varepsilon_{C-C}^* + C_0\kappa_1}, \qquad (3)$$

where $$\varepsilon_{C-C}^*$$

is defined in Equation (2). Since $C_0$ is a constant real number, this parameter can be set to 1 for simplicity. In this setting, $$\varepsilon_{C-C}^*$$

and $\kappa_1$ now represents complex capacitance and conductance instead of complex permittivity and conductivity.

The EP effect can be problematic while obtaining an accurate spectrum that reflects the dielectric properties of the object under test, especially in analyzing liquids. Electrodes themselves can have interfaces that can block a large amount of charge, resulting in an electric double layer that can behave like a non-ideal capacitor. Experimental and mathematical methods can be used to eliminate or reduce the influence of the EP effect. Some mathematical approaches can show plausible results in compensating for the EP effect. Therefore, the present disclosure can utilize mathematical methods to alleviate the EP effect. The EP effect can be modeled as a constant phase element (CPE):

$$Z_{CPE}^* = \frac{1}{Q(j\omega)^n}, \qquad (4)$$

where $Q > 0$ quantifies the strength of EP effect and $n \in [0, 1]$ is the phase of the CPE component. The CPE model can have excellent performance in describing the EP effect on aluminum electrodes.

To address the conductivity of the interface between electrodes and electrolyte, a resistance $r_e$ can be introduced. The impedance of EP effect component can be written as:

$$Z_{EP}^* = \frac{r_e}{1 + r_e Q(j\omega)^n} \qquad (5)$$

Without wishing to be bound by any particular scientific theory, since the EP effect can be happening in the vicinity of the electrodes while the majority of cell suspension is in between, the EP effect component and cell suspension component can be in series (See FIG. 7). Thus, the total impedance can be expressed as:

$$Z_{total}^* = Z_{CS}^* + Z_{EP}^*, \qquad (6)$$

where $$Z_{CS}^* \text{ and } Z_{EP}^*$$

are as defined in Equation (3) and Equation (5).

The final model can include 4 Cole-Cole relaxation parameters: $\Delta\varepsilon$, $f_{C-C}$, $\varepsilon_h$, and $\alpha$, defined in Equation (2), 2 CPE parameters: $Q$ and $n$, defined in Equation (4), and 2 conductivity parameters: $\kappa_1$ and $r_e$, defined in Equation (3) and Equation (5).

Under sinusoidal AC conditions, complex permittivity and impedance spectra can bear the same information, but they can convey different messages, and both have physical significance. In other words, the complex electrical variable can have two different forms named permittivity and impedance. A fitted curve with minimum error in impedance may be non-optimal in permittivity, and vice versa. Without wishing to be bound by any particular scientific theory, this can be because the transformation (see Eq. (1)) is not linear, and variables being very close to each other may become far away after the transition. In some cases where impedance has more importance over permittivity, data can be presented and fitted using impedance (e.g., transepithelial/transendothelial electrical resistance, TEER), while in other cases where permittivity is more important, permittivity can be used instead (e.g., dielectric properties of liquids). However, as disclosed herein, impedance and permittivity are largely intertwined and both of them can be important. To avoid this dilemma, the present disclosure can utilize a well-defined distance to balance impedance and permittivity. A logarithm can easily solve this problem:

$$\ln\varepsilon_1^* - \ln\varepsilon_2^* = \ln\frac{1}{jC_0\omega Z_1^*} - \ln\frac{1}{jC_0\omega Z_2^*} = \ln Z_2^* - \ln Z_1^*. \qquad (7)$$

Formatting data into $\ln Z^*$ can result in a consistent definition of distance whether impedance or permittivity is used. Those 8 parameters can be obtained by minimizing the following loss function:

$$L(\hat{Z}^*, Z^*) = \sum_{k=1}^{K} \left\| \ln \hat{Z}_{f_k}^* - \ln Z_{f_k}^* \right\|, \qquad (8)$$

where $$\hat{Z}_{f_k}^*$$

is the predicted impedance at the kth frequency in the frequency list using Equation (6), and $$Z_{f_k}^*$$

is the corresponding impedance measurements.

By minimizing the loss function defined in Equation (8), the eight parameters that reflect physics-based features can be extracted from impedance data. The minimization problem can be solved in MATLAB R2020a by the "fmincon" function using the "sqp" method with gradient provided.

Viable cell count (VCC) can be an important CQA in cell manufacturing, providing guidance to decision-making in cell culture processes. The present disclosure can use a gray-box model to predict VCC and evaluate its accuracy with image-based cell count data. In the present example, eight physics-based features can be extracted from experimental data as described above. Among those eight features, three features can be used in predicting VCC with the "Enhanced Gray-box" model: $\Delta\varepsilon$, $f_{C\text{-}C}$, and $\kappa_1$. The "Enhanced Gray-box" model can be expressed as below:

$$\ln VCC = \ln c_1 + c_2 \ln \Delta\varepsilon + c_3 \ln f_{C\text{-}C} + c_4 \ln k_l, \qquad (9)$$

where $c_1 > 0$, $c_2$, $c_3$, and $c_4$ are parameters to be determined in the linear regression. The linear regression can be conducted in Python 3.8.3 using the "LinearRegression" class in the "sklearn" package.

The Gray-box model can be inspired by a physics-based model where cells are assumed as colloidal suspensions where the colloids have thin, insulating shells (cell membranes) and conducting kernels (cytoplasm). Those simplified cells can induce Maxwell-Wagner relaxation. In the relaxation process, ions in the cytoplasm and the culture media can move under AC electric field force and stop when they reach the cell membrane. Since the cell membrane is only insulating if it is viable and becomes permeable if dead, only viable cells can be detected with the impedance sensor and dead cells are transparent. This feature renders impedance sensors a special capability of monitoring only viable cells, which is desirable in cell manufacturing.

The Maxwell-Wagner relaxation of spherical single-shelled cells can be described in the equation below:

$$\Delta\varepsilon = \frac{9 r C_m}{4\varepsilon_0} P, \qquad (10)$$

where the relaxation strength $\Delta\varepsilon$ is proportional to cell radius r, cell volume fraction P and specific capacitance of the cell membrane $C_m$. $\varepsilon_0$ is the vacuum dielectric constant.

Since the relaxation strength $\Delta\varepsilon$ is proportional to cell volume fraction P, $\Delta\varepsilon$ is often used as an indicator of viable cell concentration (VCC).

The Maxwell-Wagner relaxation strength $\Delta\varepsilon$ can be used to predict the amounts of cells. As Equation (10) suggested, in cases where specific capacitance of cell membrane $C_m$ and cell radius r remain constant, relaxation strength $\Delta\varepsilon$ can be proportional to cell volume fraction P. Noticing that viable cell volume fraction P is equal to the product of VCC and cell volume, Equation (10) can be rewritten as:

$$VCC = \frac{\Delta\varepsilon\varepsilon_0}{3 C_m \pi r^4}. \qquad (11)$$

In cases where average cell size does not change much (e.g., the cells are not actively multiplying, or multiplying but not synchronously), $\Delta\varepsilon$ alone can be sufficient to predict VCC. However, in T-cell culturing, such assumptions do not hold true. T-cells can change dramatically in size when activated and start to multiply. The cells can be thawed and centrifuged together, and thus they may multiply synchronously to some extent. The present disclosure can include more features to predict cell radius r.

Cell radius r can be reflected by the characteristic frequency $f_c$ of Maxwell-Wagner relaxation:

$$r = \frac{\kappa_i \kappa_a}{\pi C_m f_c (\kappa_i + 2\kappa_a)}, \qquad (12)$$

where $\kappa_i$ is conductivity of cytoplasm, and $\kappa_a$ is conductivity of culture media. Assuming that $\kappa_i$, $\kappa_a$, and $C_m$ are constants, r is inversely proportional to $f_c$. In an equivalent circuit model, characteristic frequency $f_c$ Maxwell-Wagner relaxation is replaced with $f_{C\text{-}C}$. Plugging this relationship into Equation (11), the following equation is obtained:

$$VCC = c_1 \Delta\varepsilon f_{C\text{-}C}^4, \qquad (13)$$

where $c_1$ is an unknown coefficient to be trained.

VCC can be predicted with $\Delta\varepsilon$ and $f_{C\text{-}C}$ using Equation (13). Since Equation (13) is derived directly from theoretical calculations with some simplification, this method can be "Physics-scaled", where $c_1$ is the scaling factor. This method is also used as a baseline to evaluate the Gray-box methods.

Derivations above are based on an assumption that a living cell can be viewed as a single-shelled spherical colloid. However, such an assumption might be oversimplified. On one hand, cells may take various shapes, especially when they are experiencing different stages of a life cycle. On the other hand, cells have intricate internal structures that may affect their electrical properties. Many organelles inside the living cell have insulating lipid bilayer membranes, such as the nucleus, endoplasmic reticulum, Golgi apparatus, and mitochondrion. Both morphology and internal structure of a cell are extremely difficult to model using physical knowledge only. Therefore, disclosed herein is a Gray-box model stemming from Equation (13) to incorporate a data-driven method with the physical knowledge. Namely, a power-law can be assumed between all variables in Equation (13), where all the exponents can be treated as unknown parameters to be trained by experimental data. The untrained Gray-box model can be expressed as below:

$$VCC = c_1 \Delta\varepsilon^{c_2} f_{C\text{-}C}^{c_3}, \qquad (14)$$

15 where $c_1$, $c_2$, and $c_3$ are calibration coefficients. By taking logarithm on both sides, the equation yields:

$$\ln VCC = \ln c_1 + c_2 \ln \Delta \varepsilon + c_3 \ln f_{C-C}. \tag{15}$$

In this form, the training problem can reduce to linear regression. This model can be referred to as the "Gray-box" model since the complete Enhanced Gray-box developed has an additional term. The "Gray-box" model can also be used as a second baseline model for a more detailed evaluation of the proposed "Enhanced Gray-box" model.

In off-line impedance measurements of cell suspensions, the composition of the electrolyte can usually be strictly controlled, since the electrical property of the electrolyte affects the total impedance. However, the composition of culturing media may constantly change over time in in-line measurements. As the cells metabolize, compositions in the culturing media and the cytoplasm can change, and their electrical properties change accordingly. These changes do not only influence the conductivity of the electrolytes but also influence the capacitance of cell membranes. Therefore, $\kappa_i$, $\kappa_a$, and $C_m$ in Equation (12) are not constant as assumed in the derivation of Equation (13). In scaled-up cell manufacturing, albeit with the help of a feedback control system, fluctuations in media composition can happen. When culturing media is not being circulated, the composition of culture media can change over time due to cell metabolism.

To help predict VCC, an additional feature extracted from raw impedance data, $\kappa_1$, which reflects media conductivity at the low-frequency limit, can be used. However, the exact relationships between $\kappa_1$ and the three factors $\kappa_i$, $\kappa_a$, and $C_m$ are unclear. Therefore, a similar approach as in the development of Equation (15) can be used by assuming a power law. The Enhanced Gray-box model with the media conductivity term can be written as below:

$$VCC = c_1 \Delta \varepsilon^{c_2} f_{C-C}^{c_3} \kappa_1^{c_4}. \tag{16}$$

Taking logarithm on both sides, Equation (9) can be apparent, the Enhanced Gray-box model.

The impedance spectrum can be automatically acquired with the LCR meter every 15 minutes. However, image-based cell count data which are used to train the models can be much less frequently acquired since the process involves manual sampling. Therefore, only a few impedance spectra that have corresponding image-based cell count data are used for model training.

16

Figure 8:
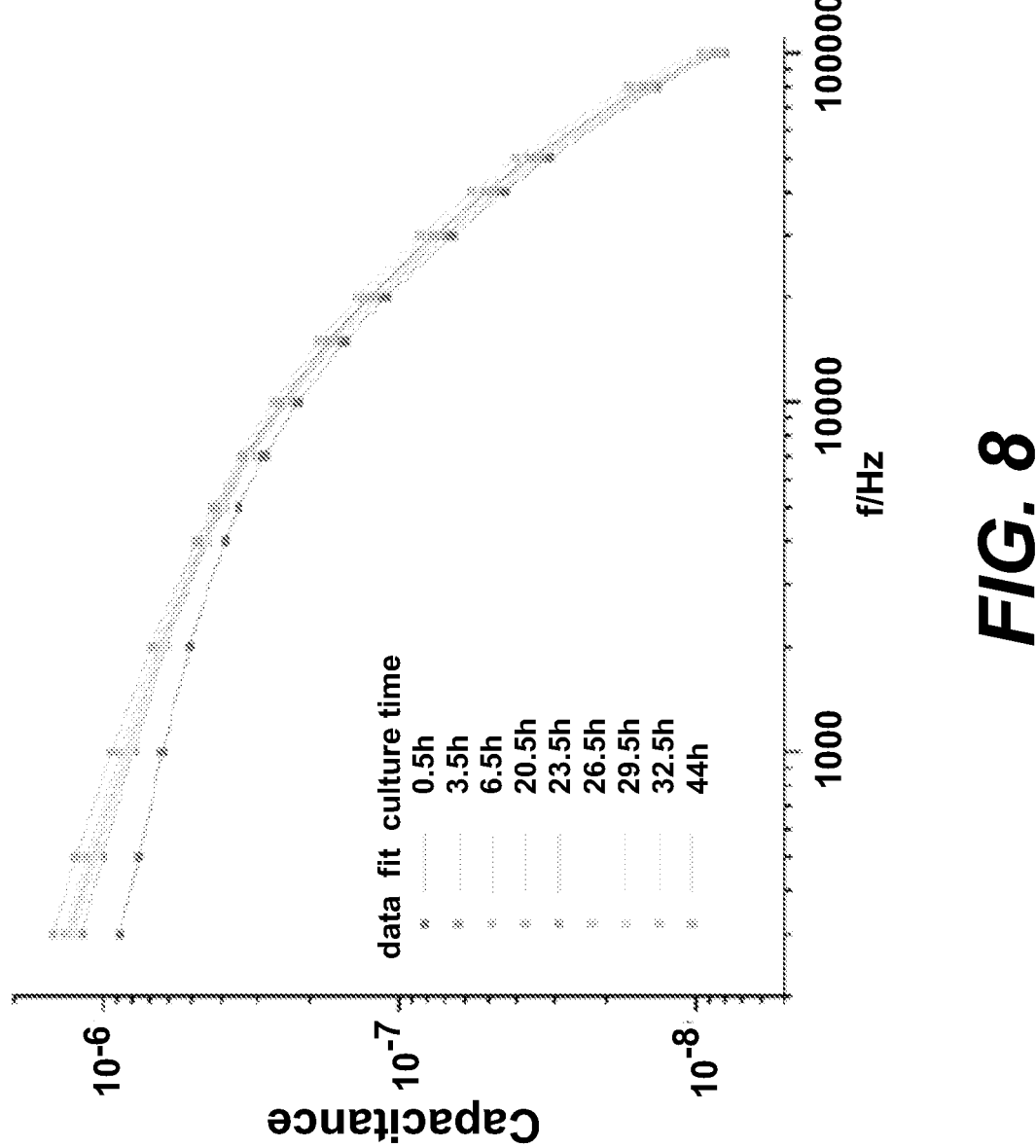
FIG. 8 illustrates a frequency explicit plot of measurements from an impedance-based biosensor according to some examples of the present disclosure.
Figures 9A, 9B:
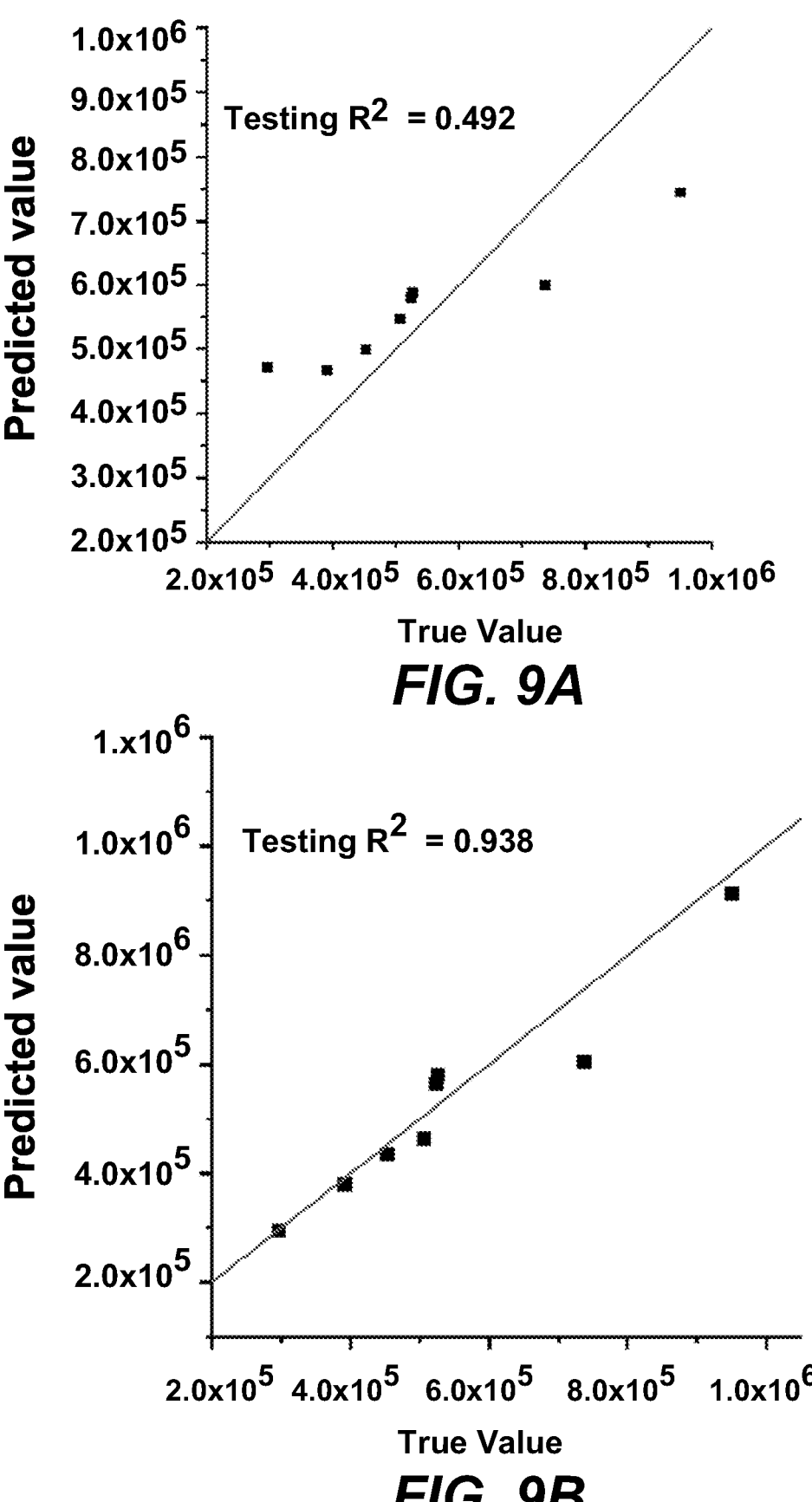
FIGS. 9A-C illustrate plots of cross-validation for methods of determining viable cell counts from impedance-based biosensors according to some examples of the present disclosure.
Figure 9C:
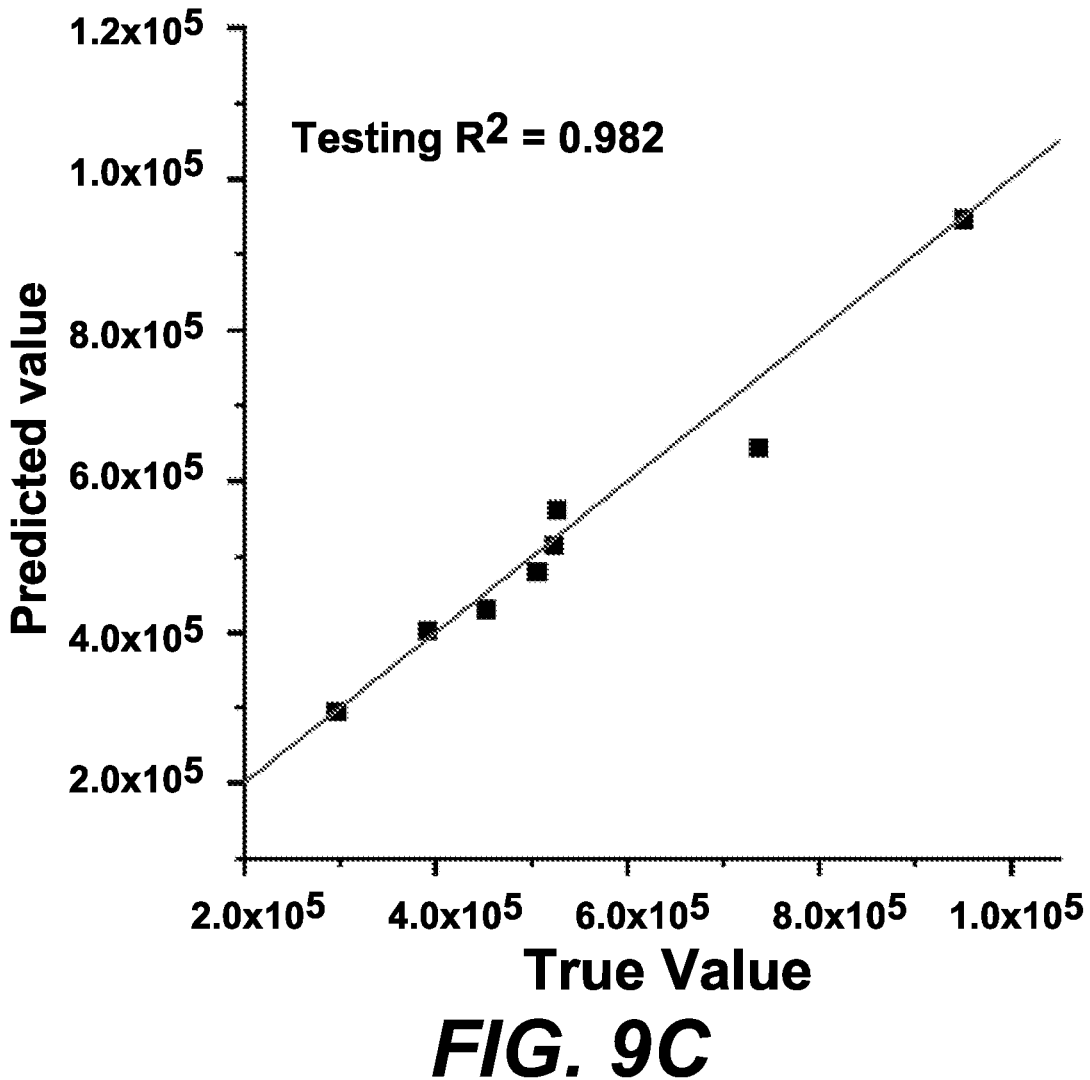
Figure 10A:
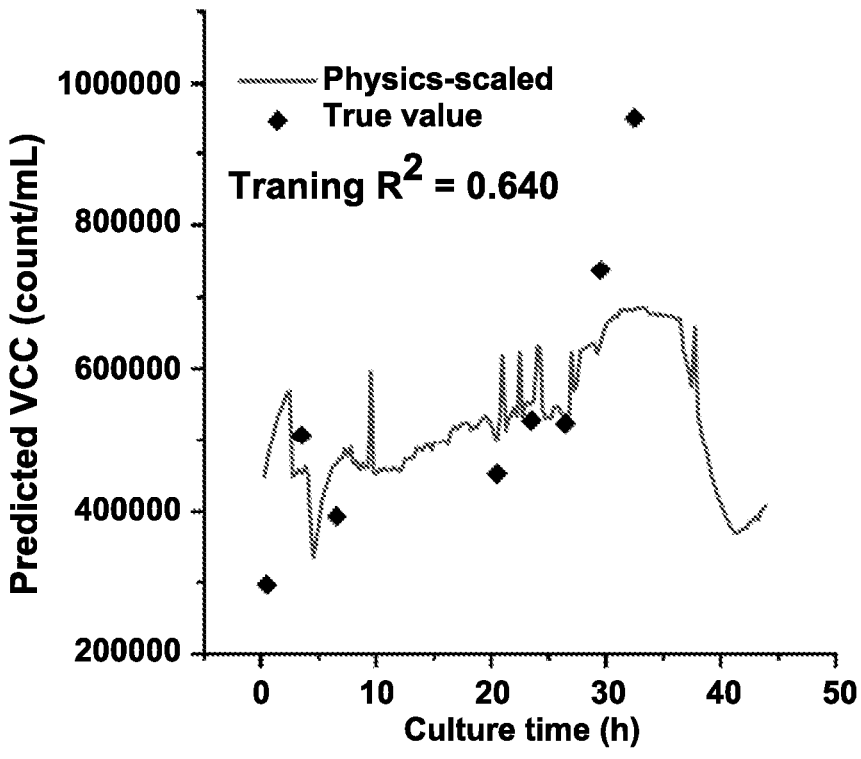
FIGS. 10A-C illustrate plots of predictions for methods of determining viable cell counts from impedance-based biosensors according to some examples of the present disclosure.
Figure 10B:
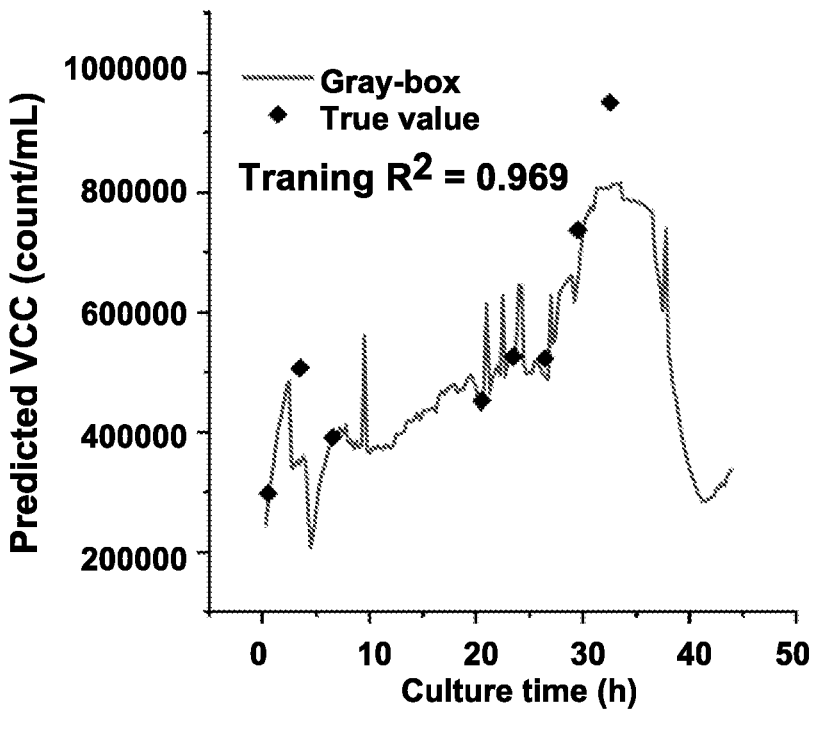
Figure 10C:
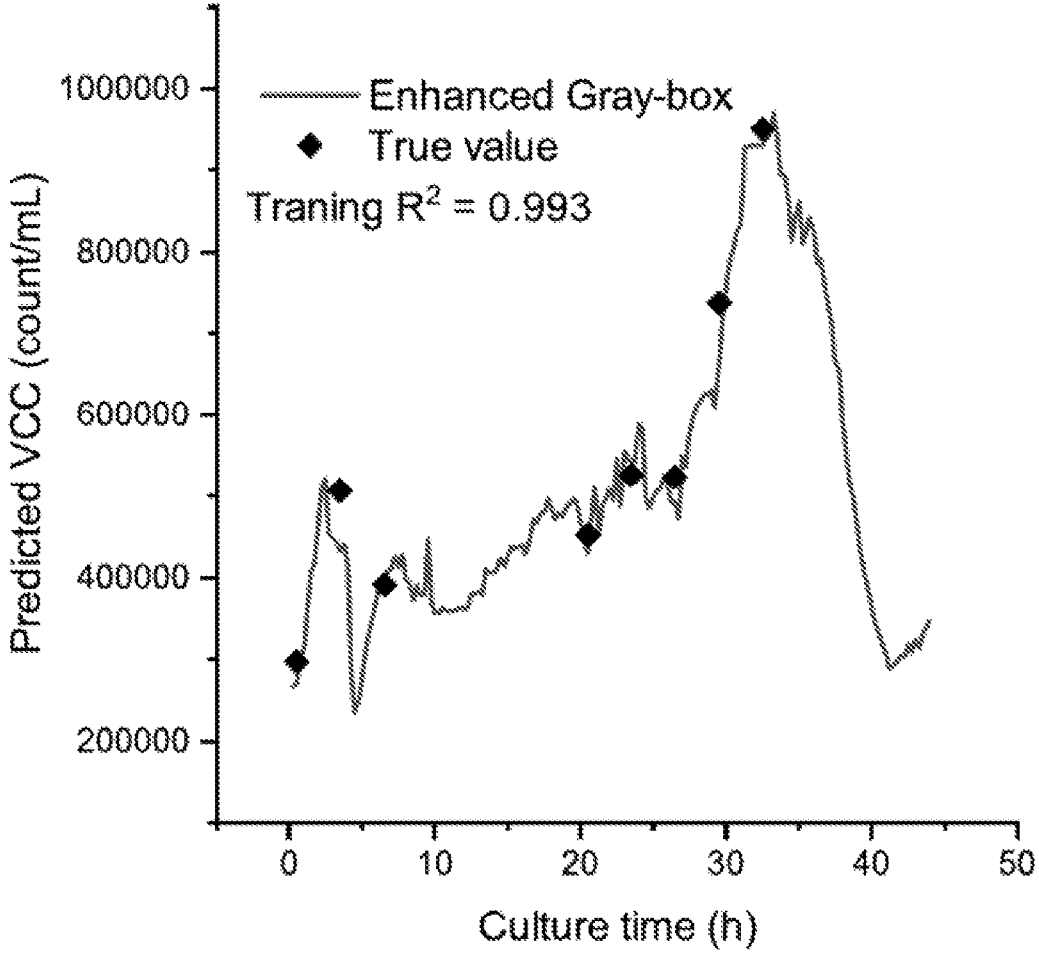

Selected data can be fitted with Equation (6) as the model and Equation (8) as the loss function. Fitted results can be visualized in a frequency-explicit plot in FIG. 8. Each spectrum ended up with a very small fitting error (R2>0.9995), indicating that the model can be capable of capturing the most significant features in the spectra acquired. Extracted features are shown in Table I.

TABLE I

| | | | | | Extracted features and fitting $R^2$ for each impedance spectrum. | | | | |
|---|---|---|---|---|---|---|---|---|---|
| Time (h) | n | Q | $f_{C-C}$(kHz) | $\alpha$ | $\varepsilon_h$ | $\kappa_i$ | $\Delta_\varepsilon$ | $r_e$ | Fitting $R^2$ |
| 0.5 | 0.771 | $8.43 \times 10^{-6}$ | 3.92 | 0.026 | $-5.16 \times 10^{-9}$ | $3.05 \times 10^{-4}$ | $1.49 \times 10^{-6}$ | 375 | 0.99998 |
| 3.5 | 0.722 | $1.58 \times 10^{-5}$ | 3.67 | 0.009 | $-6.37 \times 10^{-9}$ | $3.13 \times 10^{-4}$ | $1.92 \times 10^{-6}$ | 264 | 0.99997 |
| 6.5 | 0.717 | $1.59 \times 10^{-5}$ | 3.56 | 0.000 | $-6.47 \times 10^{-9}$ | $3.29 \times 10^{-4}$ | $2.12 \times 10^{-6}$ | 263 | 0.99987 |
| 20.5 | 0.708 | $1.78 \times 10^{-5}$ | 3.52 | 0.000 | $-7.22 \times 10^{-9}$ | $3.44 \times 10^{-4}$ | $2.20 \times 10^{-6}$ | 267 | 0.99993 |
| 23.5 | 0.704 | $1.87 \times 10^{-5}$ | 3.66 | 0.000 | $-7.77 \times 10^{-9}$ | $3.46 \times 10^{-4}$ | $2.18 \times 10^{-6}$ | 252 | 0.99991 |
| 26.5 | 0.704 | $1.87 \times 10^{-5}$ | 3.61 | 0.000 | $-7.62 \times 10^{-9}$ | $3.53 \times 10^{-4}$ | $2.20 \times 10^{-6}$ | 249 | 0.99992 |
| 29.5 | 0.705 | $1.78 \times 10^{-5}$ | 3.79 | 0.000 | $-7.21 \times 10^{-9}$ | $3.53 \times 10^{-4}$ | $2.07 \times 10^{-6}$ | 254 | 0.99992 |
| 32.5 | 0.705 | $1.90 \times 10^{-5}$ | 4.00 | 0.000 | $-9.10 \times 10^{-9}$ | $4.08 \times 10^{-4}$ | $2.14 \times 10^{-6}$ | 210 | 0.99991 |
| 44 | 0.681 | $2.54 \times 10^{-5}$ | 3.35 | 0.000 | $-8.14 \times 10^{-9}$ | $3.89 \times 10^{-4}$ | $2.45 \times 10^{-6}$ | 219 | 0.99994 |

The extracted features show some patterns that may provide some insights into what happened in the culture process. The extracted empirical parameter $\alpha$ in the Cole-Cole relaxation model can be very close to 0, meaning that the Maxwell-Wagner relaxation in the cell suspension can largely be described with the Debye relaxation model. Debye relaxation is an "ideal" relaxation process with a single time constant and a single characteristic frequency. According to Equation (12), cell radius can be reflected by characteristic frequency $f_c$. This can infer that the cells are largely monodisperse in size, without wishing to be bound by any particular scientific theory.

Q and $\Delta \varepsilon$ can show a similar growing trend over the culture process. Without wishing to be bound by any particular scientific theory, this can result from the cells that enter the EP double layer. On one hand, cell growth in size and concentration can be reflected by relaxation strength $\Delta \varepsilon$ (see Equation (10)). On the other hand, cells within the EP double layer can also grow in size and concentration and affect the EP effect.

The fitted permittivity at the high-frequency end $\varepsilon_h$ can be negative, which is not frequently seen in liquid electrolytes. The reason why $\varepsilon_h$ is negative can be inductance in the sensing system, without wishing to be bound by any particular scientific theory. By using a 4-point AC measurement setup, inductance in the cables can mostly be canceled out, but there might be some residue that shows its influence in the high frequencies. However, since fitted $\varepsilon_h$ values are very close to zero and very small compared to $\Delta \varepsilon$, it can be largely negligible.

To train all models, 9 data points can be collected from the image-based cell counter throughout the cell culture process. Since the 9th data point is where cells start to die and the cell counter cannot provide an accurate number on viable cell count, this data point can be discarded for model training.

To distinguish effective training from pure hindsight, K-fold cross-validation can be employed to test each of the methods. Among all eight data points, each one can be selected in turn to be the testing data and the rest are training data. Training and testing errors can be reported for each method. Since linear regression in the "Physics-scaled" method can be directly conducted using extracted features and image-based cell count, while in "Gray-box" and "Enhanced Gray-box" methods, all parameters can be taken as a logarithm before running the linear regression algorithm, conversion can occur prior to calculation of $R^2$. Final models can be trained using all eight data points for optimum performance. Cross-validations and final predictions for all methods are plotted in FIGS. 9A-C and FIGS. 10A-C, respectively. Optimal coefficients are listed in Table II.

TABLE II

| Linear regression coefficients and $R^2$ for each method. | | | | | | |
|---|---|---|---|---|---|---|
| Method | $c_1$ | $c_2$ | $c_3$ | $c_4$ | Training $R^2$ | Testing $R^2$ |
| Physics-scaled | $1.296 \times 10^{-3}$ | (1) | (4) | (0) | 0.640 | 0.492 |
| Gray-box | $5.620 \times 10^{-5}$ | 2.769 | 7.462 | (0) | 0.969 | 0.938 |
| Enhanced Gray-box | $7.561 \times 10^{-6}$ | 3.760 | 8.642 | −0.951 | 0.993 | 0.982 |

From the results, the training result from the "Physics-scaled" method can show roughly the same trend as the image-based data. The "Gray-box" method can have a significant improvement in both training and testing performance compared to the "Physics-scaled" method. The "Enhanced Gray-box" method can show even better performance on top of the "Gray-box" method.

The flexibility of the gray-box models can permit larger values of $c_2$ and $c_3$ in both gray-box methods, resulting in a higher overall slope. With several adjustable parameters, the untrained model can transform the extracted features into a variety of possible curves. The linear regression algorithm can find the one closest to the true values. Generally speaking, the more flexible model is, the more likely a curve close enough to the data points can be found. However, too much flexibility can easily lead to overfitting, where the noise is also treated as a result of key features in the data. The overfitted model can only fit the training dataset but has poor performance in predicting new data. The two gray-box models both can show excellent results in K-fold validation, indicating that the trained models very likely reveal some nature about the cell suspension, rather than finding meaningless curves close to the data points by coincidence.

Figure 11A:
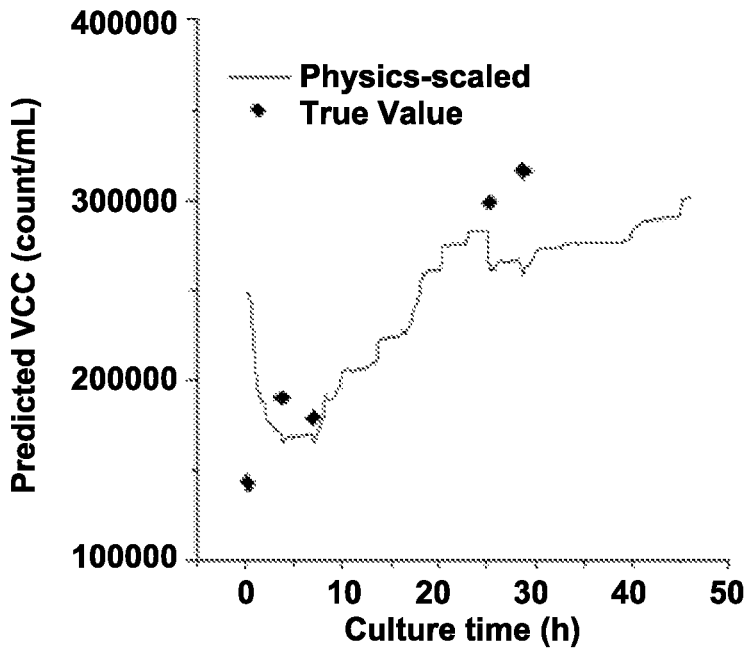
FIGS. 11A-C illustrate plots of training model predictions for methods of determining viable cell counts from impedance-based biosensors according to some examples of the present disclosure.
Figure 11B:
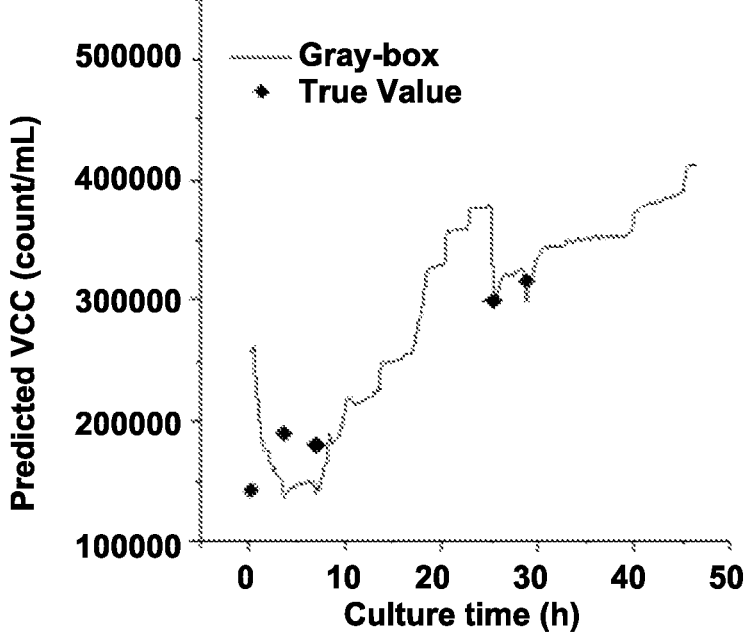
Figure 11C:
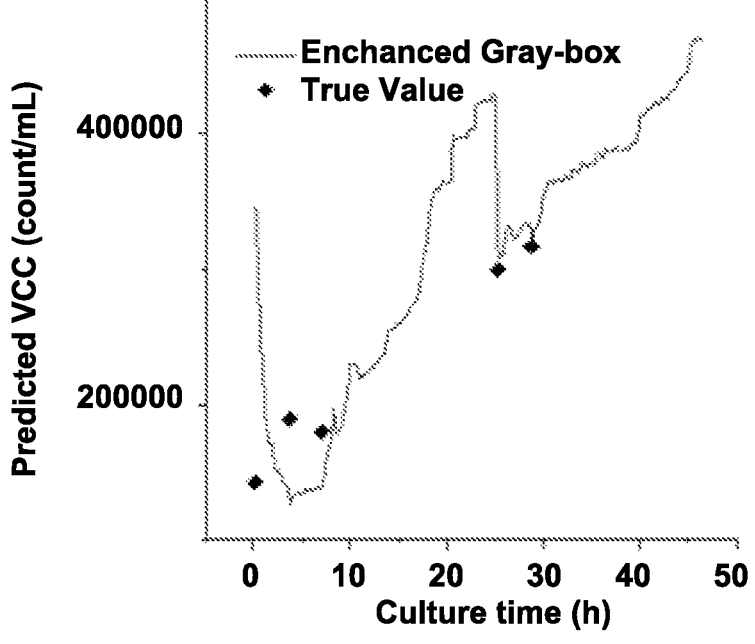

The trained models can be applied to data collected from other cell culturing processes. Predicted values and true values are plotted together in FIGS. 11A-C. Predicted values with the exact values in Table 2 can result in much higher than true values, but after adjusting the scaling factor $c_1$, the gray-box models can show an improvement compared to "Physics-scaled" in a similar way as in the dataset used to train the models. These results show that the power-law dependencies suggested by the trained gray-box models can better describe the cell suspension than the physics-based model. However, since the scaling factor $c_1$ can be different for each culturing process, $c_1$ can contain some case-specific parameters that affect the sensor readings. For example, a change in the distance between the two electrodes can lead to a difference in impedance readings. One possible way to obtain the case-specific parameters is a calibration before use. Another possible way to find these case-specific parameters and cancel out their impact can be to use multiple sensors with different geometries and apply a calibration-free framework to the sensing system.

All three methods can suggest a deep dive in cell count from the 2nd to the 5th hours after the initial surge. Image-based cell count data can also confirm this phenomenon. A similar cell growth trend also appears in FIGS. 11A-C.

The results shown in Table II indicates the optimal parameters trained by only a few data points. A minor shift away from those values may not affect the accuracy much but can improve the performance of the model in predicting new data. From the trained "Enhanced Gray-box" model, the methods disclosed herein can develop a "Rectified" model:

$$VCC = 6 \times 10^{-10} \Delta\varepsilon^3 f_{C-C}^8 \kappa_1^{-1}. \tag{17}$$

Figure 12B:
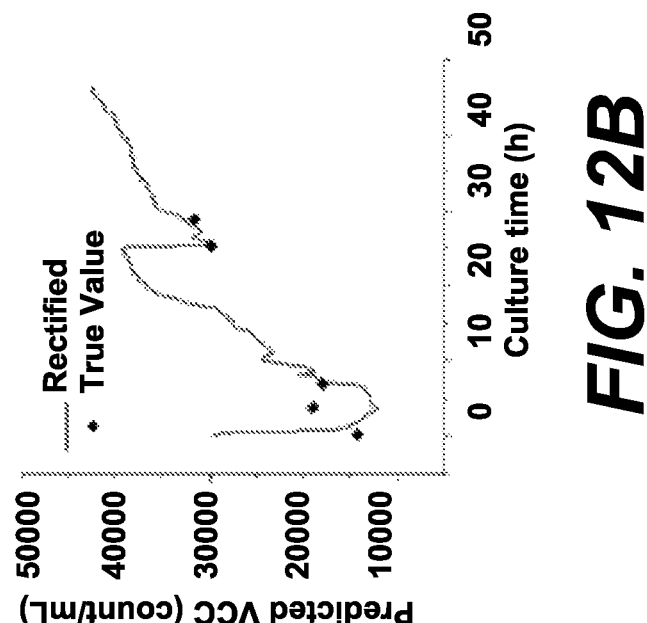
FIGS. 12A-B illustrate plots of rectified model predictions for methods of determining viable cell counts from impedance-based biosensors according to some examples of the present disclosure.
Figure 12A:
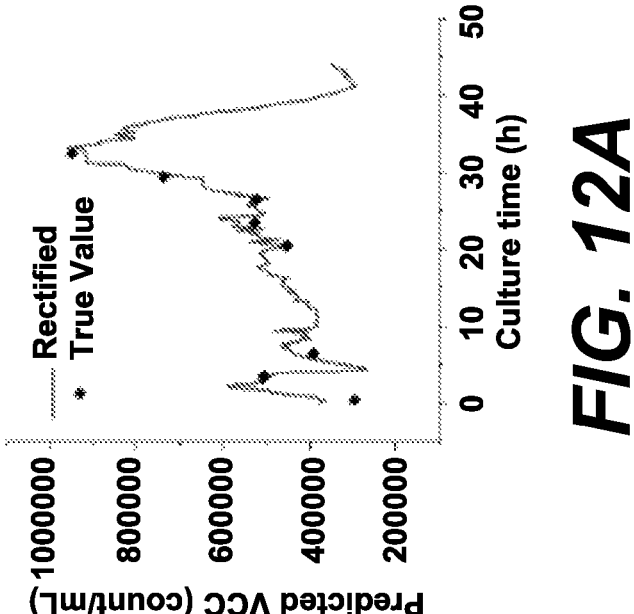

As shown in FIGS. 12A-C, a model with modified parameters from the trained "Enhanced Gray-box" model can have excellent performance with both datasets. Note that the parameters $\Delta\varepsilon$, $f_{C-C}$, and $\kappa_1$ in Equation 17 only represent numerical values extracted with the equivalent circuit model. For simplicity of the model, $\Delta\varepsilon$ and $\kappa_1$ both can contain the geometric constant $C_0$ which can vary for different sensors. However, the exponents of Equation 17 can still describe the same dependency even though sensor geometry is different.

The electric property of suspension of monodisperse, spherical cells can be influenced by at least four independent variables: VCC, cell size, the capacitance of cell membrane $C_m$ and conductivity of the culturing media K. In other words, this system can have at least four degrees of freedom. However, in the "Enhanced Gray-box" method, such systems can be described using only three variables: $\Delta\varepsilon$, $f_{C-C}$, and $\kappa_1$. In scenarios where dependencies change or disappear (e.g., different patient or different cell types), extra parameters and further analysis can be used.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. An impedance-based biosensor system for determining viable cell count (VCC) in a culture medium containing cells comprising:

an impedance-based biosensor;

an impedance data acquisition system configured to acquire impedance data from the impedance-based biosensor; and a data processing system configured to calculate the VCC based on the impedance data;

19 wherein:
the data processing system is further configured to:
process the impedance data of a cell suspension component and an electrode polarization component;
extract physics-based cell suspension parametric features from the impedance of the cell suspension component;
extract physics-based electrode polarization parametric features from the impedance of the electrode polarization component; and
predict the VCC based upon modeling; and
the impedance data acquisition system comprises an LCR meter configured to measure an impedance of the cell suspension component and the electrode polarization component.

2. The impedance-based biosensor system of claim 1, wherein:
the electrode polarization component comprises a first flat electrode and a second flat electrode;
the first flat electrode and the second flat electrode are in parallel; and
the cell suspension component is a volume between the first flat electrode and the second flat electrode.

3. The impedance-based biosensor system of claim 1, wherein:
the electrode polarization component is a substrate configured to flex and conduct electricity; and
the cell suspension component is a volume in which the substrate is disposed.

4. The impedance-based biosensor system of claim 1, wherein:
the electrode polarization component comprises a first probe and a second probe; and
the cell suspension component comprises a hollow fiber lumen in which the one or more of the probes are disposed.

5. The impedance-based biosensor system of claim 1, wherein:
the electrode polarization component is defined by an electrode polarization model expressed in permittivity;
the cell suspension component is defined by a cell suspension model expressed in impedance;
the relationship between the electrode polarization and the cell suspension model is defined as:

$$\varepsilon^* = \frac{1}{jC_0\omega Z^*}; \text{ and}$$

$\varepsilon^*$ is permittivity, $Z^*$ is impedance, $\omega$ is radial frequency, j is the imaginary unit, and $C_0$ is a sensor geometry constant.

6. The impedance-based biosensor system of claim 5, wherein:
the model of the cell suspension component is defined as the Cole-Cole relaxation model; and
the impedance of the cell suspension component is calculated according to the Cole-Cole relaxation model adjusted by a culture media conductivity constant.

7. The impedance-based biosensor system of claim 5, wherein:
the electrode polarization component is defined as a constant phase element; and

20 the impedance of the electrode polarization component is calculated by adjusting the constant phase element by a resistance constant.

8. The impedance-based biosensor system of claim 5, wherein the electrode polarization component and the cell suspension component are configured to be in fluid communication with a culture medium containing the cells.

9. A method of determining viable cell count (VCC) in a culture medium containing cells comprising:
measuring, by the impedance-based biosensor system of claim 1, the impedance of the electrode polarization component and the cell suspension component, via the LCR meter;
calculating a total impedance of the electrode polarization component and the cell suspension component; and
calculating the VCC based on the total impedance.

10. The method of claim 9, wherein the culture medium containing cells comprises living human cells.

11. The impedance-based biosensor system of claim 1, wherein the predicting the VCC based upon modeling comprises:
predicting the VCC with an equation in a physics-scaled model including a first calibration coefficient and variables derived directly from theoretical calculations;
predicting the VCC with an equation in a gray-box model utilizing a power-law between the variables of the physics-scaled model, which includes the first calibration coefficient and gray-box calibration coefficients for each of the variables reflecting the power-law; and
predicting the VCC with an equation in an enhanced gray-box model comprising the equation of the gray-box model multiplied with one or more extracted features, each extracted feature raised to an enhanced gray-box calibration coefficient, the one or more extracted features selected from a group consisting of the physics-based cell suspension parametric features and the physics-based electrode polarization parametric features.

12. The impedance-based biosensor system of claim 11, wherein:
the equation in the physics-scaled model is $$VCC = c_1\Delta\varepsilon f_{C-C}^4;$$

the equation in the gray-box model is $$VCC = c_1\Delta\varepsilon^{c_2} f_{C-C}^{c_3}; \text{ and}$$

the equation in the enhanced gray-box model is $$VCC = c_1\Delta\varepsilon^{c_2} f_{C-C}^{c_3} \kappa_1^{c_4};$$

where:
$\Delta\varepsilon$ represents a relaxation strength in the Cole-Cole relaxation model;
$f_{C-C}$ represents a characteristic frequency in the Cole-Cole relaxation model;
$\kappa_1$ represents a culture media conductivity constant; and
$c_1$, $c_2$, $c_3$, and $c_4$ are the calibration coefficients.

13. The impedance-based biosensor system of claim 11, wherein the data processing system is further configured to:

evaluate an accuracy of at least one of the models against image-based viable cell count data.

14. The impedance-based biosensor system of claim 11, wherein the data processing system is further configured to:

train at least one of the models with image-based viable cell count data.

15. The impedance-based biosensor system of claim 11, wherein the data processing system is further configured to:

evaluate an accuracy of each of the models against image-based viable cell count data; and train at least the gray-box and enhanced gray-box models with image-based viable cell count data;

which training refines the adjustable calibration coefficients $c_1$, $c_2$, $c_3$, and $c_4$ until a desired level of accuracy of predicted VCC is reached.

16. A method of determining viable cell count (VCC) in a culture medium containing cells comprising:

measuring, by the impedance-based biosensor system of claim 15, the impedance of the electrode polarization component and the cell suspension component, via the LCR meter;

calculating a total impedance of the electrode polarization component and the cell suspension component; and calculating the VCC based on the total impedance.

17. A system comprising:

a hollow fiber bioreactor comprising:

an inlet configured for a continuous perfusion of a culture medium containing cells;

an outlet configured for a removal of waste products; and a bioreactor extending from the inlet to the outlet, the bioreactor having an exterior wall defining a bioreactor volume therewithin, the exterior wall accommodating semi-permeable hollow fibers in the bioreactor volume, the bioreactor volume having an intracapillary (IC) volume component within the hollow fibers and an extra capillary (EC) volume component outside the hollow fibers;

a trans-wall impedance-based biosensor comprising:

an IC probe in fluid communication with the IC volume component; and one or more EC probes in fluid communication with the EC volume component;

an impedance data acquisition system configured to acquire impedance data from the trans-wall impedance-based biosensor; and a data processing system configured to calculate a viable cell count (VCC) of cells in the bioreactor based on the impedance data;

wherein the data processing system is further configured to:

process the impedance data of a cell suspension component and an electrode polarization component;

extract physics-based cell suspension parametric features from the impedance of the cell suspension component;

extract physics-based electrode polarization parametric features from the impedance of the electrode polarization component;

predict the VCC with an equation in a physics-scaled model including a first calibration coefficient and variables derived directly from theoretical calculations; predict the VCC with an equation in a gray-box model utilizing a power-law between the variables of the physics-scaled model, which includes the first calibration coefficient and gray-box calibration coefficients for each of the variables reflecting the power-law;

predict the VCC with an equation in an enhanced gray-box model comprising the equation of the gray-box model multiplied with one or more extracted features, each extracted feature raised to an enhanced gray-box calibration coefficient, the one or more extracted features selected from a group consisting of the physics-based cell suspension parametric features and the physics-based electrode polarization parametric features;

evaluate an accuracy of each of the models against image-based viable cell count data;

train each of the models with the image-based viable cell count data; and output the calculated VCC of the trained enhanced gray-box model.

* * * * *